United States Patent [19]

Mott

[11] Patent Number: 4,731,044

[45] Date of Patent: Mar. 15, 1988

[54] TENSION SENSOR AND CONTROL ARRANGEMENT FOR A CONTINUOUSLY VARIABLE TRANSMISSION

[75] Inventor: Philip J. Mott, Des Plaines, Ill.

[73] Assignee: Borg-Warner Automotive, Inc., Troy, Mich.

[21] Appl. No.: 810,461

[22] Filed: Dec. 18, 1985

[51] Int. Cl.⁴ .............................................. F16H 55/56
[52] U.S. Cl. ........................................ 474/8; 474/17;
474/101; 73/862.48; 73/862.49
[58] Field of Search ............................... 424/101–103,
424/109, 12, 8, 17, 18, 19, 25–27; 73/862.48,
862.45, 862.49

[56] References Cited

U.S. PATENT DOCUMENTS

| | | | |
|---|---|---|---|
| 2,647,965 | 8/1953 | Michie | 200/52 |
| 2,999,395 | 9/1961 | Van Doorne | 474/8 |
| 3,115,049 | 12/1963 | Moan | 74/472 |
| 3,596,528 | 8/1971 | Dittrich et al. | 74/230.17 F |
| 3,600,960 | 8/1971 | Karig et al. | 74/230.17 F |
| 3,992,932 | 11/1976 | Venema | 73/862.19 |
| 4,203,319 | 5/1980 | Lechler | 73/862.49 |
| 4,246,807 | 1/1981 | Kofink | 74/872 |
| 4,261,213 | 4/1981 | Rattunde | 474/18 |
| 4,281,539 | 8/1981 | Keller | 73/862.54 |
| 4,292,031 | 9/1981 | Rattunde | 474/18 |
| 4,321,991 | 3/1982 | Teijido et al. | 474/19 |
| 4,350,491 | 9/1982 | Stever | 474/12 |
| 4,403,975 | 9/1983 | Rattunde | 474/18 |
| 4,433,594 | 2/1984 | Smirl | 74/689 |
| 4,439,170 | 3/1984 | Stever | 474/18 |
| 4,448,275 | 5/1984 | Kitagawa et al. | 180/79.1 |
| 4,450,728 | 5/1984 | D'Angelo et al. | 73/862.28 |
| 4,458,318 | 7/1984 | Smit et al. | 364/424.1 |
| 4,478,595 | 10/1984 | Hayakawa et al. | 474/109 |

OTHER PUBLICATIONS

"Measurement of Torsional Vibration in Rotating Machinery"—*Transactions of the ASME Journal of Mechanisms, Transmissions and Automation in Design*—Jul., 1985.

*Primary Examiner*—Stephen J. Novosad
*Assistant Examiner*—Bruce M. Kisliuk
*Attorney, Agent, or Firm*—Florian S. Gregorczyk; James A. Geppert

[57] ABSTRACT

Tension in the belt of a continuously variable transmission (CVT) is sensed and utilized in the CVT control arrangement. Apparatus for sensing the centerline tension of the belt are taught; these sensors provide the required tension signal to a signal meter or the control arrangement.

16 Claims, 15 Drawing Figures

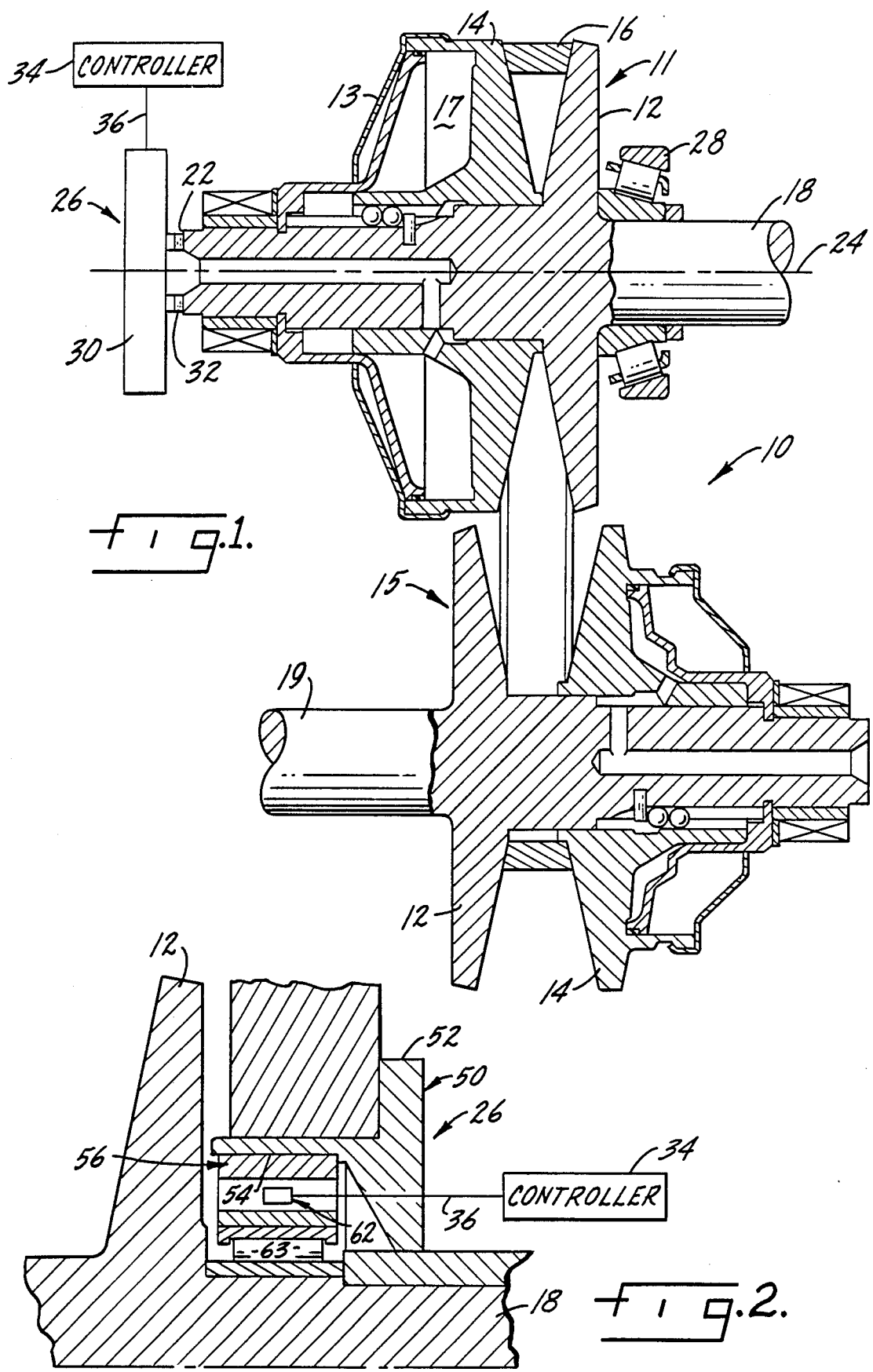

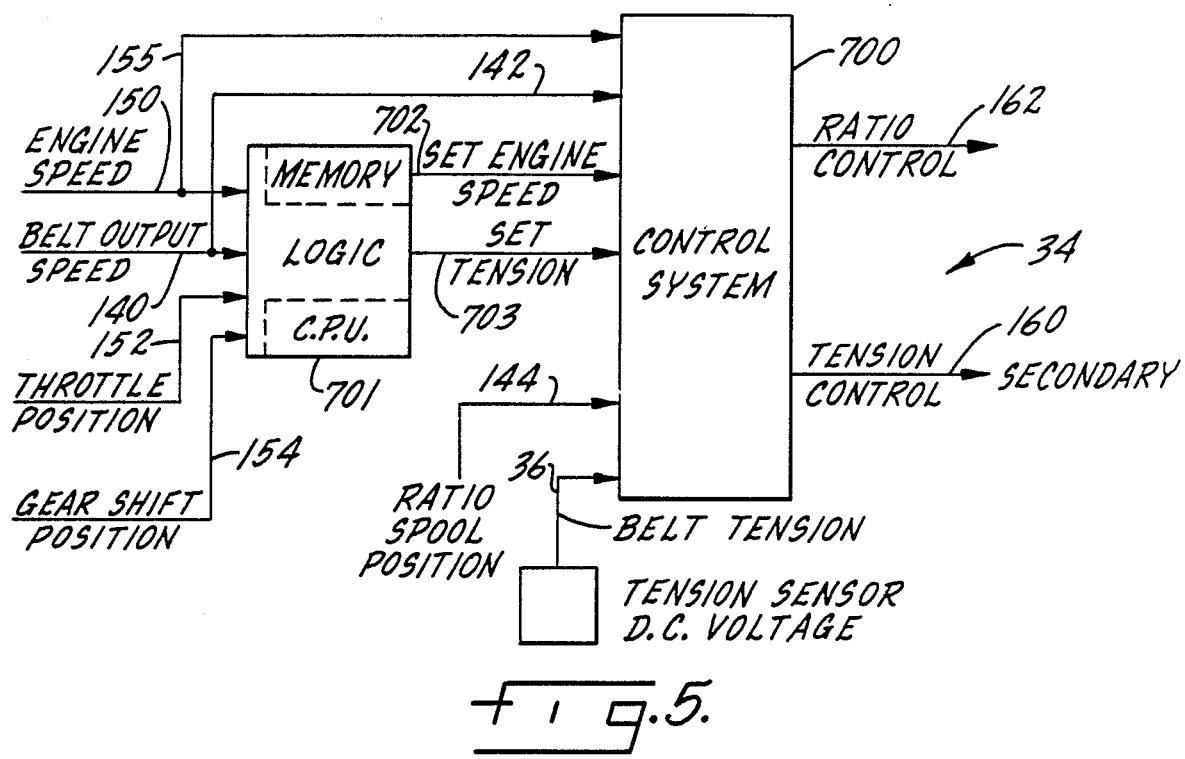
Fig. 5.
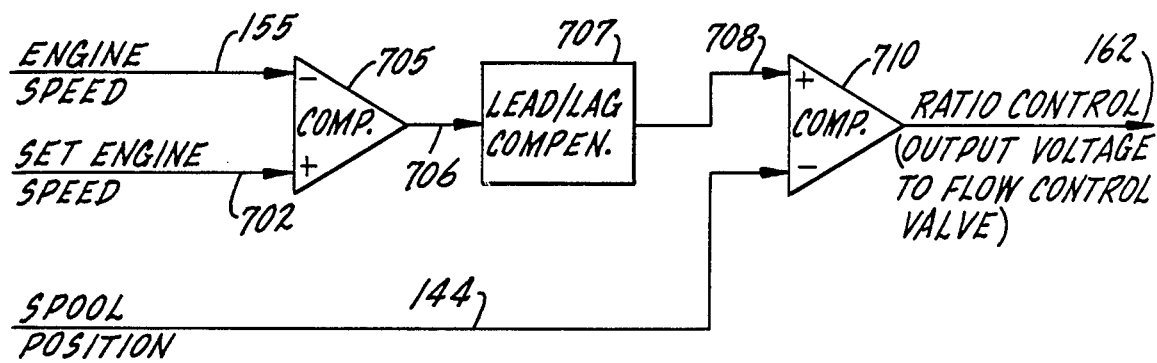
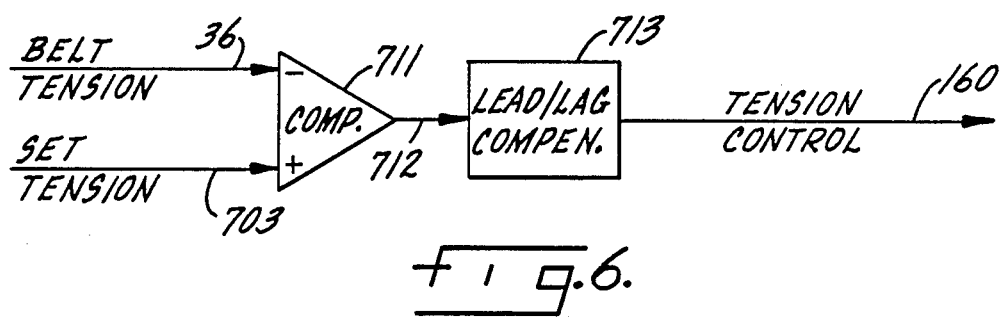
Fig. 6.

INPUT SPEED

OUTPUT SPEED

LINE PRESSURE
(ON OUTPUT SHEAVE)

RATIO PRESSURE
(ON INPUT SHEAVE)

CENTERLINE (BELT) TENSION

TENSION SENSOR AND CONTROL ARRANGEMENT FOR A CONTINUOUSLY VARIABLE TRANSMISSION

BACKGROUND OF THE INVENTION

1. Field of the Invention

Variable pulley transmission assemblies or continuously variable transmissions (CVTs) known in the prior art generally comprise pulleys which (in effect) have an adjustable diameter, a connecting belt and a control unit. Automotive applications for a CVT generally utilize hydrodynamic and/or clutch assemblies as starting devices and to effect a change of direction. A change of belt ratio, when the pulleys are stopped, requires that the belt slide across the pulley faces causing wear on both the belt and the pulley surfaces, and requires a great deal of force to perform such a belt movement. Belt movement force, the rate of ratio change and rate of sheave movement are controlled by the control unit as a function of measured parameters or calculated values.

A significant improvement in variable pulley transmissions is described in U.S. Pat. No. 4,433,594—Smirl entitled "Variable Pulley Transmission", and assigned to the assignee of this application. In that patent, a primary sheave pulley is mounted on an input drive shaft to which a vibration damper is connected; the damper is affixed to a flywheel. A secondary variable sheave pulley is mounted on a second shaft, and connected to the primary pulley by a flexible belt, such that the pulleys are continuously rotating during engine operation. This arrangement provides a CVT mechanism where the pulleys are in continous rotation during engine operation, which rotation provides ease of belt ratio shift even at a stopped or idle position of the engine. Even with the marked improvement achieved by the control arrangement in the described patent, substantial efforts are still being directed to further improve the CVT control systems.

2. The Prior Art

U.S. Pat. No. 4,458,318—Smit et al teaches a control arrangement for a CVT system to govern the sheave diameter of the pulleys and the operation of a slippable starting clutch. The control system includes a conventional computer coupled in series with a control system. Information signals provided to the computer include engine output speed, transmission [or belt] output speed, throttle position, and gearshift position. Utilizing this information, the computer sets desired values for the engine speed, CVT system pressure, and clutch coolant. The control system uses these set signals, with additional information from the CVT fluid system to regulate the CVT ratio and line pressure in the CVT fluid system to maintain the requisite belt tension, and the on-off state of the fluid cooling for the clutch. U.S. Pat. No. 2,647,965—Michie teaches an apparatus utilizing a mechanical linkage to maintain constant tension on a belt in a CVT type transmission by controlling the stroke of the sheaves. This linkage is a simple lever, pivoted in the middle of the free strand of the belt, such that the opening of one sheave is mechanically tied to the closing of the other sheave. Thus a stroke of one sheave is exactly the same as the stroke of the other sheave. This presumes that such opening and closing will maintain constant tension in the belt. However, it can be shown that due to the belt geometry, the sheaves do not open and close at the same rate at constant tension.

Several alternative apparatus for control of CVT-type transmissions utilize a torque sensor associated with one of the shafts and to control the hydraulic pressure in one of the movable sheave chambers to affect the torque of such shaft. In some cases, it is the intent to maintain either an adequate, minimal or constant tension on the belt operable between the sheaves. U.S. Pat. No. 3,600,960—Karig et al illustrates torque sensing control apparatus utilizing a torque-sensing or torque-responsive movement of at least two of the sheaves, which control is stated to be load-responsive to the hydraulic contact pressure applied at the driven side of the transmission. This contact pressure has to be exerted at the driven side to prevent the transmitting element, the belt, from slipping between the two pairs of conical pulley disks. The signal from the torque sensor provides a means of controlling the fluid flow and thereby for maintaining and changing the speed ratio of the transmission. Further, at column 3, line 25, the inherent problem of all the torque-sensing apparatus is noted, that is, that the contact pressure must be greater than desired. A torque sensing control system is also taught in U.S. Pat. No. 3,115,049—Moan, which provides a CVT-type transmission wherein loading of the belt is provided in accordance with the torque transmitting requirements of such transmission.

Torque sensors are utilized for transmission control throughout the automotive industry. Such sensors are provided in U.S. Pat. Nos. 4,450,728—D'Angelo et al and 4,448,275—Kitagawa et al. In the '275—Kitagawa et al patent, a torque sensor generates an electrical signal representative of a change of state of a coupling between a first and second rotor, which rotors are coupled by a torsion spring. This change in state is caused by relative rotation of the rotors, which represents or detects torque in a power assisted steering system of an automotive vehicle. The U.S. Pat. No. 4,450,778—D'Angelo et al patent teaches a vehicle-force measurement system for determining the force output of a vehicle. This system utilizes a fifth wheel to provide an accurate vehicle speed reading, and torque and RPM sensors are used to determine the total power output of the vehicle. The force output of the vehicle is provided as a function of both the total power output and the speed signal.

U.S. Pat. No. 4,292,031—Rattunde teaches a CVT-type transmission utilizing a torque sensor mounted on one of the shafts along with one of the pulleys of such transmission. The torque sensor provides a signal to control the hydraulic pressure in one of the movable sheaves of either of said pulleys. The movable sheave on which the torque sensor is mounted moves against the belt or transmission member with a force which is a function of the torque measured by the torque sensor.

A further example of a control system for a CVT transmission is provided in U.S. Pat. No. 4,246,807—Kofink wherein a torque transducer on the engine drive shaft provides an input to a microprocessor. The microprocessor controls the movable sheaves to determine the transmission ratio of the CVT belt, which ratio is provided by pressing together the halves of one pulley of such belt drive system. In an automotive transmission, there are limits on the belt drive, such that the lowest transmission ratio is automatically produced from the maximum torque regulated speed to the maximum power regulated speed; while at the highest transmission ratio, switching is automatically provided from the engine at its maximum power speed to regulation of the engine at its maximum torque speed. Thus, the belt is operable between a maximum torque and maximum speed at the highest and lowest ratios. However, there is no provision to measure the changes between these limits.

A typical prior art control arrangement is taught in U.S. Pat. No. 3,596,528—Dittrich et al, wherein the fluid pressure on the sheaves is controlled hydraulically. This patent also recognized the desirability of maintaining the contact pressure of the sheaves on the belt so that it is just adequate to prevent slippage of such belt at any speed ratio. A pressure control valve, which is mechanically adjustable by the action of the torque, is used to control the hydraulic pressure to the load responsive as well as the speed responsive portions of the sheaves.

The use of torsional measurements on shafts is well known in the art. Devices and techniques are discussed in an article entitled "Measurement of Torsional Vibration In Rotating Machinery", from the *Transactions of the ASME Journal of Mechanisms, Transmissions and Automation in Design*, July 1985, wherein several alternative means of torque or torsional measurement on shafts is discussed. Among those methods discussed are the use of strain gages and transducers for providing electromagnetic signals. Problems connected with the use of strain gages and the variations in frequency output, including those differentials for steady state versus dynamic conditions are discussed throughout the article. An optical type transducer is discussed as an alternative means of measurement of torsional response from a shaft. There was no teaching or illustration of the use of strain gages for the measurement of a reaction force in a shaft, especially not related to a CVT transmission.

It has been found that the use of a fixed hydraulic force to control the belt tension, that is, the transmission member, and the torque output during transient changes therein does not provide accurate control in a CVT. Loss of or variations in control leads to low performance shifts during change of ration and can potentially damage the belt, pulley sheaves, or both items. In a CVT, a downshift is generally considered the highest loaded condition, and it is desirable to control the force on the movable sheave to maintain at least a minimal belt tension, as was noted in the prior art cited above. It has been shown and it is known that even at a steady state condition for an automobile, there is between a five and ten percent variation in the belt tension from the theoretically predicted value due to the mechanical variations within the drive train and transmission, that is, broadly speaking, physical deviations from specifications. Maintenance of belt tension during downshifts is an important factor to prevent slip. The present invention provides a means to monitor the tension in the belt throughout the operating range of a CVT transmission. This monitored tension is communicated to a control circuit for control of a CVT.

SUMMARY OF THE INVENTION

The present invention includes a belt tension sensing apparatus and a control arrangement using such apparatus with a CVT-type transmission. CVT's generally include a primary pulley mounted on a first shaft, a secondary pulley mounted on a second shaft and a torque transfer means, such as a belt, coupling the pulleys. The belt tension sensor is positioned to respond to a force transmitted through one of the first or second shafts. The force sensed by the tension sensor provides a signal to a utilization means, which force is correlative to the belt tension.

The utilization means for the signal from the tension sensor may be a control arrangement for a CVT with at least one of the pulleys having at least one movable sheave to control or effect the transmission ratio, and to maintain the belt tension. The control arrangement can include the tension sensor providing the belt tension signal to a controller coupled to the sensor. Responsive to the belt tension control signal, the controller provides a signal for adjusting the movable sheave or sheaves to control the tension in the belt as a function of the monitored belt tension.

BRIEF DESCRIPTION OF THE DRAWING

In the several figures of the drawings, like reference numerals identify like components, and in those drawings:

FIG. 1 is a schematic drawing of a cross-section through a pair of pulleys illustrating a first embodiment of the tension sensor arrangement;

FIG. 2 is a diagrammatic cross-sectional view of an alternative embodiment of the tension sensor;

FIGS. 5 and 6 are block diagrams.

DETAILED DESCRIPTION OF THE INVENTION

Figure 3:
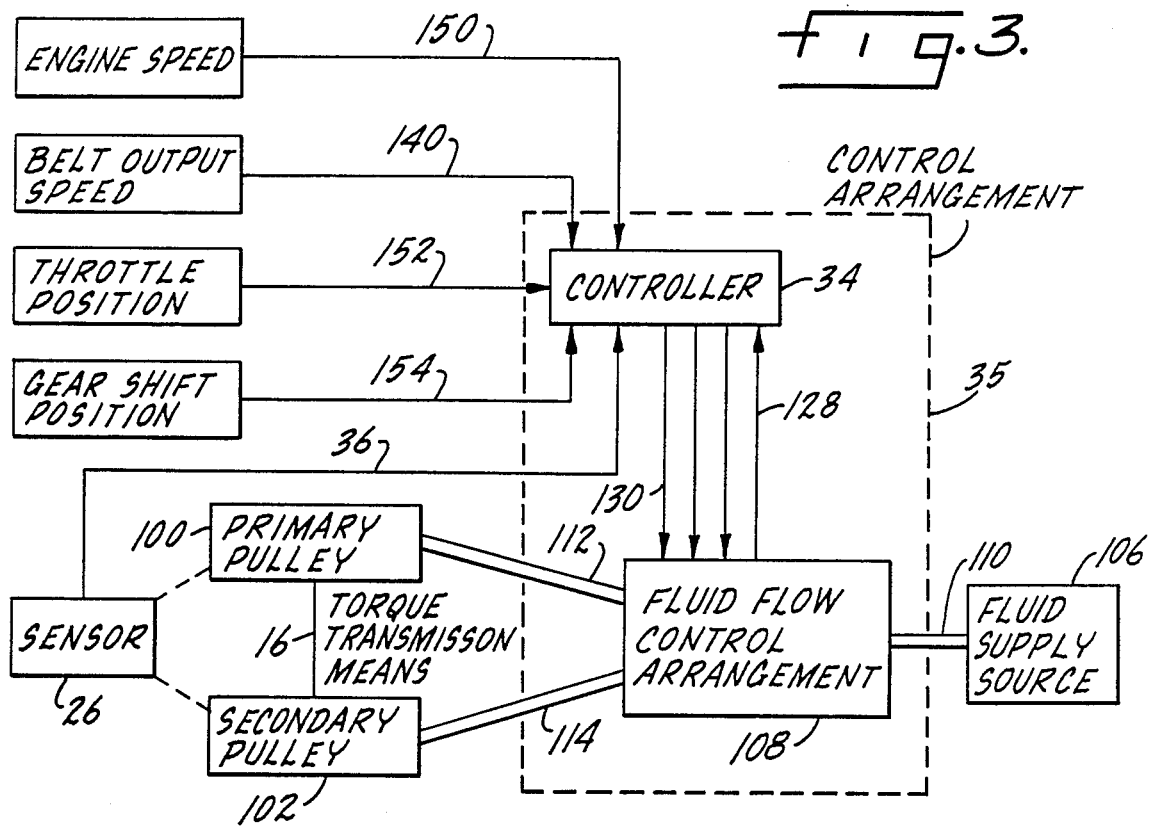
FIG. 3 is a schematic block diagram illustrating an example of a control system utilizing a tension sensor.
Figure 4:
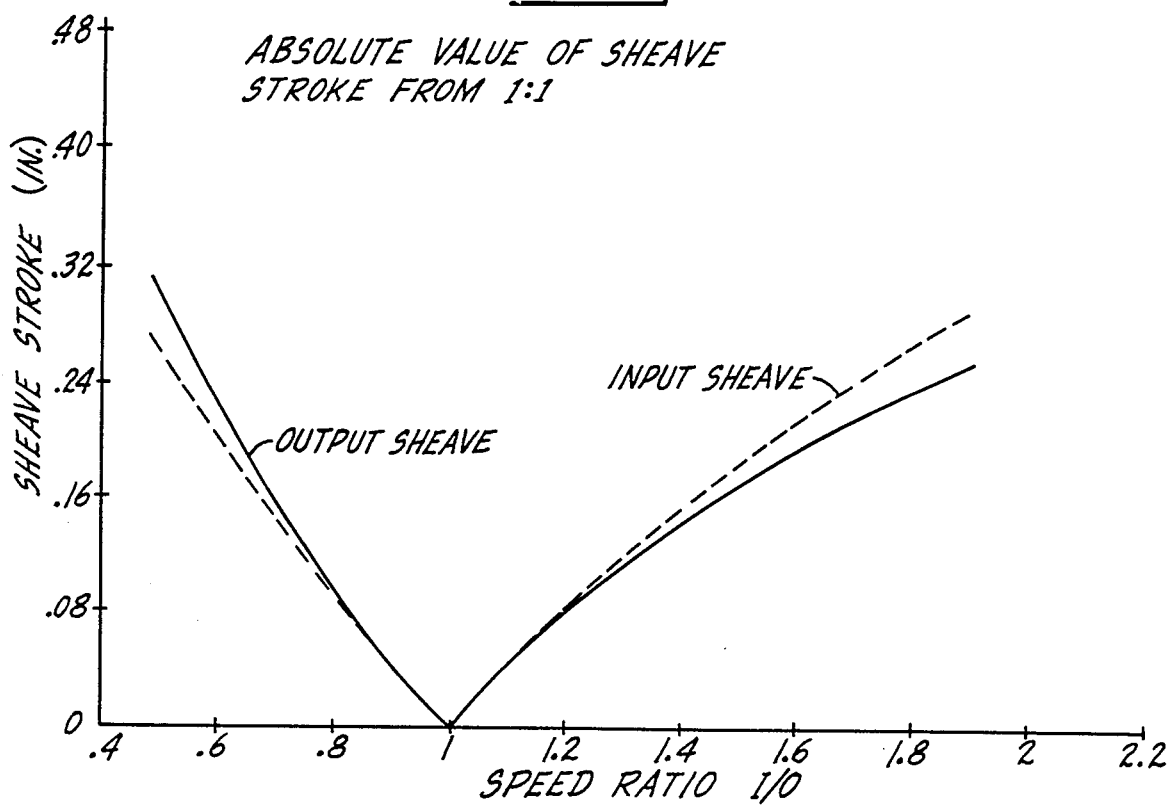
FIG. 4 is a graphical illustration showing the difference between the changes in the belt tension or sheave separation for the input and output sheaves with a change in the speed ratio.

FIG. 1 illustrates a movable sheave type pulley arrangement 10 utilized in a CVT-type transmission. Primary pulley 11 and secondary pulley 15 include a fixed sheave 12 and a movable sheave 14 mounted on a first shaft 18 and a second shaft 19, respectively, and having a torque transmission means such as a belt 16 coupling pulleys 11 and 15. Shaft 18 or 19 defines a movable sheave end 22 and a longitudinal axis 24. A wall 13 cooperates with sheave 14 to define a hydraulic fluid cavity 17 for movement of movable sheave 14. A tension sensor assembly 26 includes a tapered roller bearing 28 mounted on shaft 18 and abutting fixed sheave 12. Sensor 26 further includes a force responsive device 30, shown as a load cell, mounted in proximity to movable sheave shaft end 22 with a thrust bearing or bearing member 32 positioned between load cell 30 and shaft end portion adjacent the movable sheave 14. Sensor 26 may be positioned to sense, either directly or indirectly, a force transmitted through a shaft 18 or 19 and a bearing 32.

Figure 10:
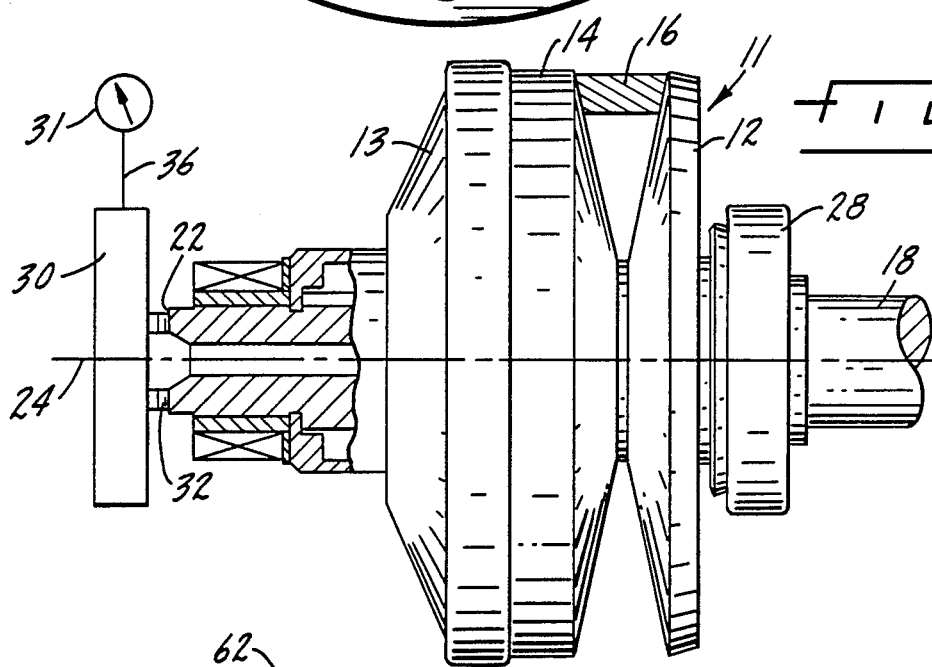
FIG. 10 illustrates the tension sensor coupled to an output signal device.

Load cell 30, such as those manufactured by Interface Manufacturing, is coupled to a utilization means 34, which may be a control arrangement, controller or output signal device, by a conductor means 36. Load cell 30 provides an electrical signal through conductor 36 to controller 34, which signal is indicative of the tension in belt means 16. In FIG. 10 load cell 30 is coupled to an output signal device 31 calibrated to provide a signal indicative of the tension in belt 16.

FIG. 1, although illustrating a pulley typical of a CVT-type transmission, is an example only, as the sensor 26 may be mounted to contact directly or indirectly first shaft 18 or second shaft 19. In fact, a CVT-type transmission, such as illustrated in U.S. Pat. No. 4,458,318—Smit et al, utilizes two such pulley arrangements with a belt or torque transfer means 16 therebetween. The belts are known in the art and may be either metallic or composition materials. Minimization of hydraulic pressure or load applied from a servomechanism on belt 16 minimizes the work required by belt 16 and a servomechanism, such as a movable pulley, thereby providing a more efficient operation. Minimal belt slip in a CVT is required as slip may abrade and erode the belt and sheave faces of pulleys 11 or 15.

Figure 8:
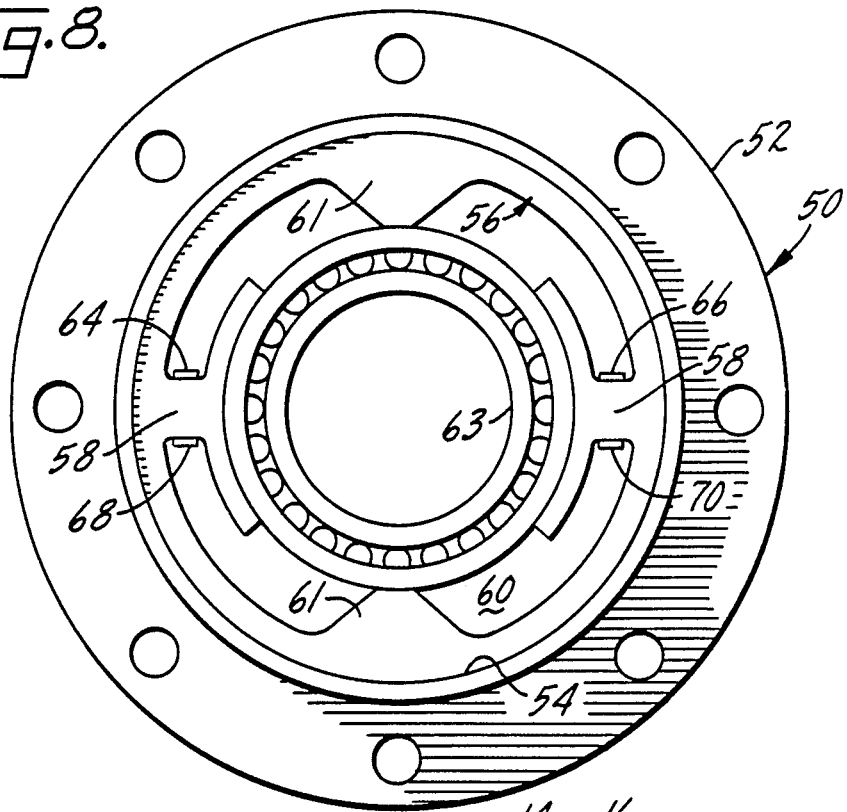
FIG. 8 illustrates a front view of the tension sensor embodiment of FIG. 2.
Figure 11:
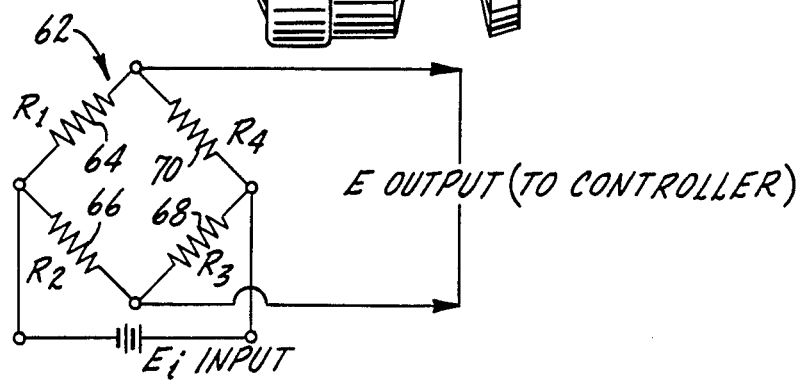
FIG. 11 illustrates a wheatstone bridge arrangement wherein the resistors are piezoresistive elements integral with the monolithic structure.

An alternative embodiment of tension sensor 26 is illustrated schematically in FIG. 2 and FIG. 8. In this embodiment, a carrier or housing 50 defines a flange 52 and a cavity 54. A retaining member 56 includes at least two arm members 58 extending into a chamber 60 defined by retaining means 56. As illustrated in FIG. 8, the arms 58 may define two arcs of an annular ring, however, this is provided as an illustration, not as a limitation. In addition, two snub-like members 61 extending from retaining means 56 in FIG. 8 are utilized to provide support for a radial bearing 63 mounted and retained between extending arms 58 within chamber 60. A sensing means or force responsive device 62, such as a monolithic, piezoresistive, four-arm, strain sensitive wheatstone bridge manufactured by Kulite Semiconductor Products, Inc., is positioned on each of arms 58. A wheatstone bridge with resistive elements 64, 66, 68 and 70 is shown in FIG. 11 and may be formed with a piezoresistive element in each resistance element ($R_1$, $R_2$, $R_3$, $R_4$) to provide a strain measurement. In FIG. 2 sensor 26 is mounted on shaft 18 with bearing 63 to abut the fixed sheave 12 of pulley 11. The sensing means 62 of sensor 26 is coupled or connected to controller 34 through conductor means 36 to provide or transmit a sensed signal from shaft 18, which signal is related to and indicative of the tension in belt 16. Sensor 26 may be mounted on either first shaft 18 or second shaft 19 or on the transmission generally in a position to monitor the belt tension.

Sensor 26 is utilized in cooperation or in conjunction with a control circuit or arrangement for a CVT-type transmission. A controller 34 for a control arrangement 35 is illustrated in FIG. 3, which controller is coupled to a fluid flow control arrangement 108 for a CVT transmission. As shown in the example of FIGS. 3 and 5-7 the CVT includes a primary pulley 100, a secondary pulley 102 and a torque transmission means such as belt 16 coupling the pulleys 100, 102. The movable sheave type pulleys 100 and 102 are provided with fluid at a pressure from a fluid supply source 106 connected to fluid flow control arrangement 108 through a conduit 110. Control arrangement 108 is coupled to primary pulley 100 and secondary pulley 102 through conduits 112 and 114, respectively. A tension sensor 26 is illustrated as connected to either primary pulley 100 or secondary pulley 102, but may be mounted on the transmission assembly at any location adequate to monitor the torque transmission means tension. In this control circuit, controller 34 receives signals from the following inuts: engine speed, belt output speed, throttle position, gearshift position, and sensing means 26. These signals are provided by sensing means [not shown] through lines or conductors 150, 140, 152, 154 and 36, respectively. In addition, controller 34 is coupled to fluid flow control arrangement 108 to receive at least one input signal and provide at least one control signal to control arrangement 108 through conductors 128 and 130, respectively. A similar control arrangement is illustrated in U.S. Pat. No. 4,458,318—Smit et al and is shown diagrammatically in FIG. 7 therein. However, in the U.S. Pat. No. 4,458,318—Smit et al patent, a feedback signal, illustrated as line pressure, is also provided to control 34. Controller 34 may include a computer 701 such as a microprocessor device.

Figure 9A:
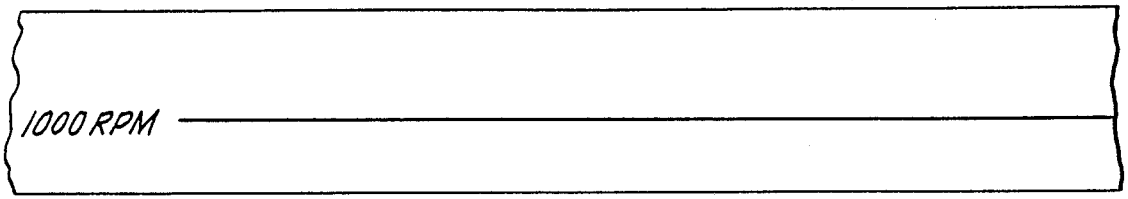
FIGS. 9a, 9b, 9c, 9d and 9e graphically illustrate an experimental result for constant input speed (9a), changes in the output speed (9b), constant line pressure (9c), variation in ratio pressure on the input sheave (9d) and variations in centerline (belt) tension at both a downshift and upshift condition (9e).
Figure 9B:
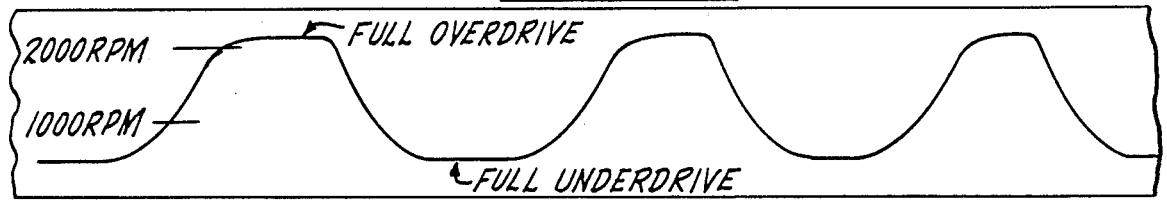
Figure 9C:
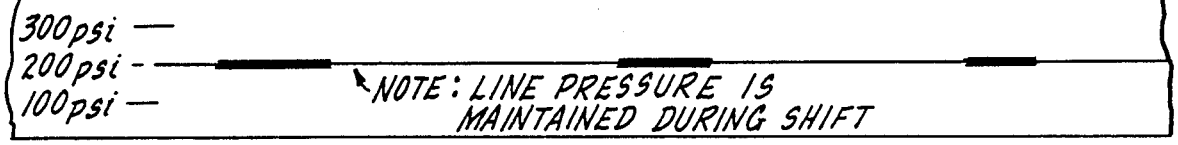
Figure 9D:
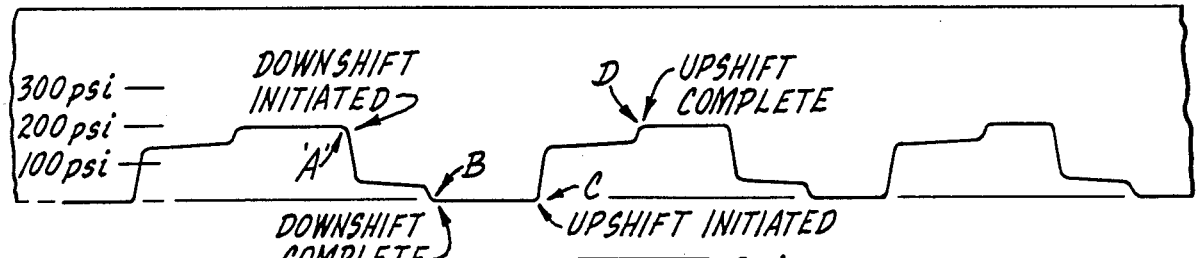
Figure 9E:
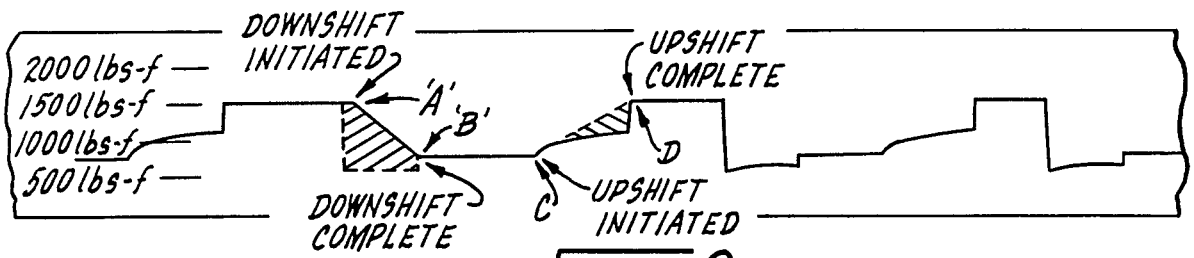

As shown in FIG. 9e, centerline tension at a downshift decreases as a step function, however, the theoretical and desired function is linearly decreasing (or increasing for an upshift) as shown by the dashed line. The difference between the theoretical and actual centerline tension represents the "slip" which is related to lost energy, sheave wear and belt wear. This is in contrast to the prior art where it was assumed that the belt tension was predicted on hydraulic line pressure to a servomechanism and the speed ratio.

FIG. 5 illustrates a diagrammatic view of a central processing unit 701, CPU, and control system 700, which may comprise controller 34. In this control arrangement, engine speed, belt output speed, throttle position, and gearshift position signals are provided to the central processing unit 701 and/or the control system 700. IN addition, a ratio spool position signal is provided from the fluid flow control arrangement 108 to the control system 700. The control system 700 is provided a set engine speed, a set tension and other signals from the central processing unit 701. The tension sensor means 26 provides a signal to the control system 700 which is a directly read and proportional signal requiring no processing or computation although such a tension signal could also be provided to CPU 701. The control system 700 thereafter provides at least a ratio control signal and a tension control signal, which tension control signal is equivalent to providing a line pressure control signal. This tension control signal is fed back or read by the sensor 26 and returned to the control system 700 for evaluation or matching. FIG. 6 illustrates a circuit that may be utilized for the diagrammatic control arrangement of FIG. 5. In this circuit, engine speed and set engine speed signals are provided to a comparator stage 705 which, on its output line 706 provides an error signal related to the error or difference between the desired engine speed, represented by the set engine speed signal on line 702, and the actual engine speed, denoted by the signal on line 155. The error signal passes through a lead/lag compensation network 707, to insure the proper phase relationship of the output signal passed over line 708 to one input connection of another comparator 710. The other input of this comparator 710 may receive a spool position indicating signal over line 144 from a ratio-conditioning amplifier valve [not shown]. Thus, this comparator 710 is in a minor control loop, utilizing information concerning the position of a spool valve to enhance the stability of the ratio or speed control. The output of comparator 710 is the ratio control signal utilized to regulate the position of the movable primary sheave and correspondingly regulate the transmission ratio. In the tension control loop, a comparator 711 receives a belt tension signal over line 36 from sensor 26, and a set tension signal over line 703 from the CPU 701. The error signal output from comparator 711 is passed over line 712 to another lead/lag compensation network 713. The output of this compensation network after amplification is passed over line 160 to regulate the fluid flow control arrangement 108 for control of the line pressure in the fluid system and thus the belt tension. This is a part of the major control loop for the belt tension regulated in the system. Because the amplification arrangement is a standard circuit, the different amplifiers or drivers for the three output signals shown in FIG. 6 are not illustrated, either there or in the schematic showing of FIG. 7.

Figure 7:
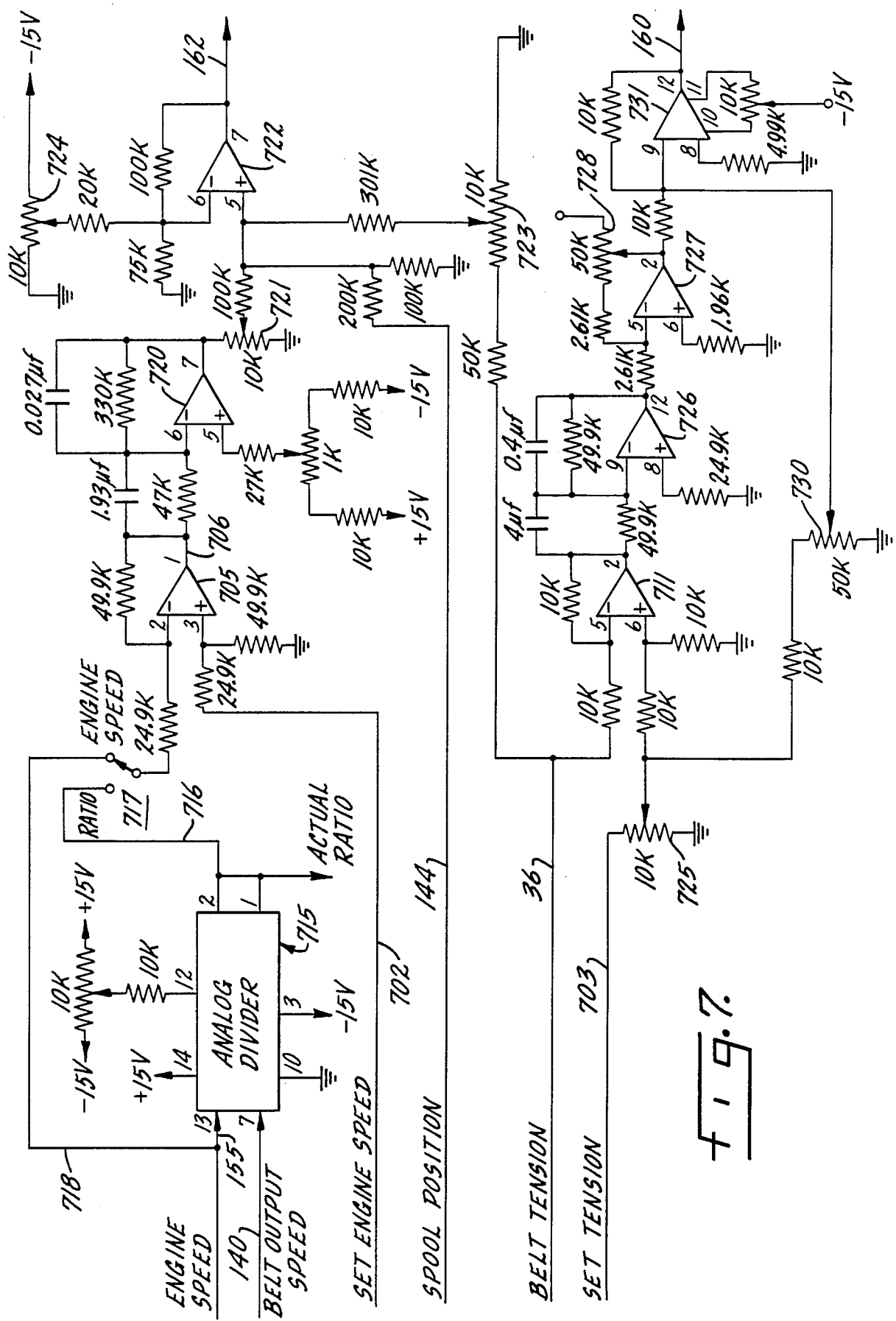
FIG. 7 is a schematic diagram of an electronic portion of the illustrated control system.

In the more detailed showing of FIG. 7, an analogue divider stage 715 is provided as shown in the input side of the ratio control circuit. This stage in an actual embodiment was a type BB4291J circuit, with the pin connections as shown, to provide a ratio denoting output signal on conductor 716 to one terminal of switch 717. In the illustrated position of this switch, the analogue divider is effectively bypassed and the engine speed signal is passed over conductor 718, contacts switch 717, and the 24.9K resistor to the inverting input connection of comparator 705. This stage also receives the setting and speed signal as already described. The output signal from this stage is passed over conductor 706 to the lead/lag compensation network 707, which includes OP amp 720, together with the circuitry associated with the OP amp. Thus, the phase-compensated output signal, which is the engine speed error signal, is dropped across potentiometer 721. The setting of this potentiometer establishes the gain for the ratio control portion of control system 700. The resultant signal from the wiper of potentiometer 721 is passed over the 100K resistor to the positive input connection of another OP amp 722. This same input connection also receives another input signal from spool position line 144, after the signal is divided down across the illustrated network. The other connection from this same input terminal of OP amp 722 extends over the 301K resistor to the wiper of a 10K potentiometer 723. This potentiometer is connected between ground and through the 50K resistor, to conductor 36 which receives the actual tension signal from sensor 26. Potentiometer 723 provides an adjustment of the bias to OP amp 722, and relates the ratio control circuit to tension, as the ratio controlling valve flow works from tension (i.e., line pressure). The 10K potentiometer 724 connected to the inverting input of OP amp 722 provides an adjustment in the circuit corresponding to the physical offset of a spool position. Those skilled in the art will understand that suitable amplification means, or a voltage-to-current amplifier can be connected between output conductor 162 and the fluid flow control arrangement valve to insure the requisite signal level and polarity.

In the lower portion of FIG. 7, the tension control circuit is depicted. The set tension signal is received over line 703, and appears across the 10K potentiometer 725. Potentiometer 725 is a means for matching the computer signal with the desired signal level required in control system 700, if any adjustment is necessary. The wiper of this potentiometer is coupled over the 10K resistor to the plus input connection of comparator 711, and the actual belt tension signal on line 36 is passed to its other input connection. Another lead/lag compensation network is provided, including OP amps 726 and 727. The 50K potentiometer 728 provides a means for gain adjustment in the tension control loop of this control system. Below the compensation network, another potentiometer 730 allows the system to be set so that the open loop value of the set tension signal, received from the computer, can effectively bypass the comparator 711 and the lead/lag compensation network including OP amps 726 and 727, and be applied directly to the inverter stage 731. The output of the inverter after suitable amplification, is then passed over line 160 to regulate the operation of a pressure control valve [not shown] in fluid control arrangement 108.

The operation of the control circuit and sensor for a CVT transmission will be discussed in terms of such a system within an automobile environment. In operation, the system is energized from the normal vehicle electrical system [not shown] in a conventional manner. After energization, the drive mode selector or gearshift lever is displaced into a forward to reverse position, and this signal appears on line 154 in FIG. 3. The engine is started, providing an engine speed signal on line 150, and a belt output speed signal on line 140. These two speed signals, on lines 150 and 140, are used in connection with the functions stored in the memory of computer 701 to select a desired engine operating speed, which is passed over line 702 to control system 700. Although the belt output speed signal is also passed to the control system, this signal is only used for calculations in the computer and in the control system is used only in a test circuit function. As the driver indicates torque demand by stepping on the pedal to open the throttle, this signal is passed over line 152 to the computer for use in providing the set tension signal on line 703 to the control system. The gearshift position signal on line 154 is particularly useful, in connection with the program stored in computer 701 to actuate a valve within the fluid flow control arrangement 108. Different computer arrangements can be utilized, and the Texas Instruments 990 family of processors has proved suitable for providing the requisite signals to control system 700. For purposes of the present invention and the appended claims, the computer can be considered as means for receiving the information signals depicted in FIG. 5, processing this information in conjunction with the stored functions, and producing the set "signals" shown on lines 702, 703 and 704 for use in the control system.

When the driver desires to accelerate the vehicle, he produces a different throttle position signal on line 152. If the transmission is in underdrive as the vehicle accelerates up to the stall point, the ratio remains the same, until the clutch locks up. During this acceleration, the actual engine signal is received over line 155 (FIG. 6 and 7), then passed to comparator 705, which also receives the set engine speed signal on line 702. For practical purposes, the belt output speed is not used in control system 700, as ratio-engine speed switch 717 is only displaced to the ratio position for test purposes. If desired, analogue divider 715 can be removed from the circuit and the engine speed signal applied directly over the 24.9K resistor to OP amp 705. The resultant error signal after phase compensation and incorporation of the spool position signal in stage 722, is used to provide the appropriate electrical control signal on line 162 and thus to the fluid flow control arrangement. Those skilled in the art will appreciate the use of an electrical signal [such as the ratio control signal] to regulate a reference flow within the fluid flow control arrangement 108 to a different level for setting the effective diameter of the primary pulley, thus determining the ratio of the transmission. In the same way, a similar signal from the belt tension sensor can be provided for regulating the effective flow and pressure in a supply line as a function of the electrical signal received over the line 160 from the control system. Controller 34 illustrated in FIGS. 1 and 3 is the same control arrangement represented by blocks 700, 701 in FIG. 5. The term "control arrangement" as used in the appended claims refers to the combination of a conventional processor such as 701 in FIG. 5 with associated control circuitry, such as that shown generally in block 700 and in more detail in FIG. 7, to provide the control signals for operating the continuously variable transmission in an optimum manner.

In the appended claims, a control arrangement 35 includes both electronic and fluid components such as those in rectangle 108 in FIG. 3. Those skilled in the art will appreciate that one valve can be utilized to translate an electrical signal into a fluid signal. The term "connected" means a DC connection between two components with virtually zero DC resistance between those components. The term "coupled" indicates there is a functional relationship between two components with the possible interposition of other elements between the two components described as "coupled" or "intercoupled".

The use of the tension sensor in lieu of a line pressure signal provides a direct signal to the controller 700 or control system to avoid a computation within the central processing unit 701. This direct read and feedback signal of the tension increases the rate of reaction of the circuit and minimizes the memory capacity of the central processing unit needed to perform this added calculation. Further, the alternative embodiments provide means of utilizing either the axial force which is resolved by the use of the tapered roller bearing or the radial component within the shaft to directly read the tension in belt 16. There is a direct correlation between belt tension and the rate of speed at which such belt changes can be made to optimize control of the CVT transmission. It is still necessary to maintain a minimal pressure and flow rate to maintain belt ratio. However, the utilization of the tension sensor slows down the rate of change to maintain proper belt tension, not a minimal pressure, to insure against an underpressure condition, and thus avoids belt slip, wear, and abrasion of the sheaves.

The effects of a change of transmission ratio on the belt tension are illustrated in FIG. 9e. The effects shown are for a downshift noted at 'A' in FIGS. 9d and 9e at a constant input speed, with the transmission at full overdrive and a hydraulic fluid line pressure held constant. The downshift is noted at FIG. 9d as a rapid decrease in the ratio pressure which correlates directly with the step function of the belt tension in FIG. 9e. In FIG. 9e 'B' denotes the graphical point where the downshift has been completed and steady state has again been attained. Similarly an upshift pattern is shown when moving from points C to D in FIGS. 9d and 9e. The theoretically desired graphical path, which is a smooth linear function from either points A to B or C to D, is provided by the present invention.

While only particular embodiments of the invention have been described and claimed herein, it is apparent that various modifications and alterations of the invention may be made. It is, therefore, the intention in the appended claims to cover all such modifications and alterations as may fall within the true spirit and scope of the invention.

I claim:

1. A tension sensor for a continuously variable transmission including a primary pulley mounted on a first shaft adapted to receive torque input, a secondary pulley mounted on a second shaft, and torque transfer means intercoupling the primary and secondary pulleys and maintained in tension, each pulley having a movable sheave to maintain tension in said torque transfer means, means for controlling movement of said movable sheaves, said tension sensor comprising a force responsive device positioned to respond to a force transmitted through one of said first and second shafts, and means for coupling said force responsive device to said control means.

2. A tension sensor for a continuously variable transmission as claimed in claim 1, including a bearing member providing contact between said force responsive device and one of the first and second shafts.

3. A tension sensor for a continuously variable transmission including a primary pulley mounted on a first shaft adapted to receive torque input, a secondary pulley mounted on a second shaft, and torque transfer means intercoupling the primary and secondary pulleys and maintained in tension, each pulley having a movable sheave for maintaining tension in said torque transfer means, meand for controlling movement of said movable sheaves, said tension sensor comprising a force responsive device positioned to respond to a force transmitted through one of said first and second shafts, said sensor including a tapered bearing, a load cell, and a thrust bearing positioned against said load cell, and means for coupling said force responsive device to said control means.

4. A tension sensor for a continuously variable transmission including a primary pulley mounted on a first shaft adapted to receive torque input, a secondary pulley mounted on a second shaft, and torque transfer means intercoupling the primary and secondary pulleys, each of said pulleys having a fixed sheave and an axially movable sheave to effect the ratio change of the transmission and to maintain the torque transfer means in tension, means for controlling movement of said movable sheaves and calibrated to indicate the tension of said torque transfer means, said tension sensor mounted to contact, directly or indirectly, one of said first and second shafts, which sensor comprises a force responsive device mounted to sense a force on said one shaft, and means for coupling said force responsive device to said control means.

5. A tension sensor for a continuously variable transmission as claimed in claim 4, including a bearing member providing contact between said force responsive device and one of the first and second shafts.

6. A tension sensor for a continuously variable transmission as claimed in claim 4, wherein said tension sensor comprises a housing defining a cavity, retaining means in said cavity, a roller bearing mounted in said cavity and secured therein by said retaining means, and said force responsive device mounted on the retaining means, which force responsive device is coupled to said control means.

7. A tension sensor for a continuously variable transmission as claimed in claim 6, wherein said roller bearing is a radial bearing mounted about said one shaft.

8. A tension sensor for a continuously variable transmission as claimed in claim 6, wherein said tension sensor bears against said one shaft to abut the fixed sheave of the pulley mounted on said one shaft.

9. A tension sensor for a continuously variable transmission including a primary pulley mounted on a first shaft adapted to receive torque input, a secondary pulley mounted on a second shaft, and torque transfer means intercoupling the primary and secondary pulleys, each of said pulleys having a fixed sheave and an axially movable sheave to effect the ratio change of the transmission and to maintain the torque transfer means in tension, means for controlling movement of said movable pulley sheaves and calibrated to indicate the tension of said torque transfer means, said tension sensor mounted to contact, directly or indirectly, one of said first and second shafts, which sensor comprises a force responsive device mounted to sense a force on said one shaft having an end portion adjacent the movable sheave mounted thereon, wherein said sensor further comprises a tapered bearing, a load cell, and a thrust bearing positioned between said load cell and said shaft end portion, and means for coupling said force responsive device to said control means.

10. A tension sensor for a continuously variable transmission including a primary pulley mounted on a first shaft adapted to receive torque input, a secondary pulley mounted on a second shaft, and torque transfer means intercoupling the primary and secondary pulleys, each of said pulleys having a fixed sheave and an axially movable sheave to effect the ratio change of the transmission and to maintain the torque transfer means in tension, means for controlling movement of said movable pulley sheaves and calibrated to indicate the tension of said torque transfer means, said tension sensor mounted to contact, directly or indirectly, one of said first and second shafts, which sensor comprises a force responsive device mounted to sense a force on said one shaft, a housing defining a cavity, retaining means in said cavity, a roller bearing mounted in said cavity and secured therein by said retaining means, said force responsive device being mounted on the retaining means and includes a wheatstone bridge, and means for coupling said force responsive device to said control means.

11. A tension sensor for a continuously variable transmission as claimed in claim 10, wherein said force responsive device is a monolithic, piezoresistive, strain sensitive wheatstone bridge.

12. A tension sensor for a continuously variable transmission including a primary pulley mounted on a first shaft adapted to receive torque input, a secondary pulley mounted on a second shaft, and torque transfer means intercoupling the primary and secondary pulleys, each of said pulleys having a fixed sheave and an axially movable sheave to effect the ratio change of the transmission and to maintain the torque transfer means in tension, means for controlling movement of said movable sheaves and calibrated to indicate the tension of said torque transfer means, said tension sensor mounted to contact, directly or indirectly, one of said first and second shafts, which sensor comprises a force responsive device mounted to sense a force on said one shaft, a housing defining a cavity, retaining means in said cavity, a roller bearing mounted in said cavity, said retaining means including a sidewall and at least two arms extending from said sidewall and defining arc segments contoured to retain said roller bearing in said cavity and having said force responsive device mounted on said arms, and means for coupling said force responsive device to said control means.

13. A control arrangement for a continuously variable transmission, which transmission includes a primary pulley mounted on a first shaft, a secondary pulley mounted on a second shaft, a belt intercoupling the primary and secondary pulleys, each of said pulleys having an axially movable sheave to effect ratio change of the transmission and to maintain the belt in tension, said control arrangement comprising a controller, a sensor positioned to provide a first control signal which varies as a function of the tension in said belt, and means for passing said first control signal to the controller, for contributing to the adjustment of the position of said movable sheaves to control the tension level of the belt.

14. A control arrangement for a continuously variable transmission as claimed in claim 13, wherein said controller is further connected to provide additional control signals as a function of received input signals including engine speed, belt output speed, throttle position and gearshift position, to govern the transmission to operate at an optimum condition for the conditions signified by the received input signals.

15. A control arrangement for a continuously variable transmission as claimed in claim 14, wherein the controller includes a computer connected to receive said input signals and to provide output signals including a set engine speed signal and a set tension signal, and a control system connected to receive said set engine speed, set tension signals and said first control signal, and to provide a ratio control signal and a belt tension control signal as a function of said first control signal.

16. A control arrangement for a continuously variable transmission as claimed in claim 14, including a fluid flow control arrangement to control the transmission ratio and the belt tension, wherein said additional control signals are provided to said flow control arrangement.

* * * * *

UNITED STATES PATENT AND TRADEMARK OFFICE
CERTIFICATE OF CORRECTION

PATENT NO. :  4,731,044

DATED      :  March 15, 1988

INVENTOR(S) : Philip J. Mott

It is certified that error appears in the above-identified patent and that said Letters Patent is hereby corrected as shown below:

Column 10, line 35, cancel "meand" and insert -- means --.

Signed and Sealed this

Thirty-first Day of January, 1989

Attest:

DONALD J. QUIGG

Attesting Officer

Commissioner of Patents and Trademarks